United States Patent
Czarny et al.

(10) Patent No.: US 9,697,367 B2
(45) Date of Patent: *Jul. 4, 2017

(54) DETERMINING WHETHER A DATA STORAGE IS ENCRYPTED

(71) Applicant: OPSWAT, Inc., San Francisco, CA (US)

(72) Inventors: Benjamin Czarny, San Francisco, CA (US); Jianpeng Mo, Burlingame, CA (US); Boris Dynin, Menlo Park, CA (US)

(73) Assignee: OPSWAT, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/294,861

(22) Filed: Oct. 17, 2016

(65) Prior Publication Data

US 2017/0032133 A1 Feb. 2, 2017

Related U.S. Application Data

(63) Continuation of application No. 15/015,084, filed on Feb. 3, 2016, now Pat. No. 9,471,794, which is a (Continued)

(51) Int. Cl.
*G06F 21/62* (2013.01)
*G06F 21/60* (2013.01)
(Continued)

(52) U.S. Cl.
CPC .............. *G06F 21/602* (2013.01); *G06F 7/02* (2013.01); *G06F 17/3007* (2013.01); *G06F 17/30135* (2013.01); *G06F 17/30312* (2013.01); *G06F 17/30371* (2013.01); *G06F 17/30386* (2013.01); *G06F 17/30864* (2013.01); *G06F 21/60* (2013.01); *G06F 21/6209* (2013.01);
(Continued)

(58) Field of Classification Search
CPC ........... G06F 17/3007; G06F 17/30312; G06F 17/30386; G06F 21/60; G06F 21/6209; G06F 21/85
See application file for complete search history.

(56) References Cited

U.S. PATENT DOCUMENTS 7,734,887 B1 6/2010 Stringham
8,402,539 B1 3/2013 Chen et al.
(Continued)

OTHER PUBLICATIONS

Advanced Security Administrators Guide, Oracle Database, Nov. 2013.
(Continued)

*Primary Examiner* — Henry Tsai
*Assistant Examiner* — John Roche
(74) *Attorney, Agent, or Firm* — The Mueller Law Office, P.C.

(57) ABSTRACT

A method, program and/or system reads first data through a first path from a location in a data storage. Second data is read through a second path from the same location in the data storage. The first data is compared to the second data. A match between the first data and the second data indicates that the first path did not encrypt the first data. A mismatch between the first data and the second data indicates that the first path encrypted the first data.

20 Claims, 5 Drawing Sheets

Related U.S. Application Data continuation of application No. 14/696,228, filed on Apr. 24, 2015, now Pat. No. 9,256,635, which is a continuation of application No. 14/255,829, filed on Apr. 17, 2014, now Pat. No. 9,021,163.

(51) Int. Cl.

| | | |
|---|---|---|
| *G06F 21/85* | (2013.01) | |
| *G06F 17/30* | (2006.01) | |
| *G06F 7/02* | (2006.01) | |
| *G06F 12/14* | (2006.01) | |
| *G06F 21/00* | (2013.01) | |
| *G06F 3/12* | (2006.01) | |

(52) U.S. Cl.
CPC .......... *G06F 21/6218* (2013.01); *G06F 21/85* (2013.01); *G06F 3/1226* (2013.01); *G06F 12/1408* (2013.01); *G06F 21/00* (2013.01); *G06F 21/62* (2013.01); *G06F 2221/2107* (2013.01)

(56) References Cited

U.S. PATENT DOCUMENTS

| | | | | |
|---|---|---|---|---|
| 9,021,163 | B1 * | 4/2015 | Czarny | G06F 21/60 710/65 |
| 9,256,635 | B2 * | 2/2016 | Czarny | G06F 21/60 |
| 9,471,794 | B2 * | 10/2016 | Czarny | G06F 21/60 |
| 2003/0037247 | A1 | 2/2003 | Obara et al. | |
| 2004/0177257 | A1 | 9/2004 | Fujinawa et al. | |
| 2005/0204154 | A1 | 9/2005 | Osaki | |
| 2007/0074292 | A1 | 3/2007 | Mimatsu | |
| 2007/0206792 | A1 | 9/2007 | Saito | |
| 2008/0082835 | A1 | 4/2008 | Asher et al. | |
| 2010/0019031 | A1 | 1/2010 | Sugiyama | |
| 2010/0287383 | A1 | 11/2010 | Conte et al. | |
| 2011/0060915 | A1 | 3/2011 | Tal | |
| 2011/0225407 | A1 | 9/2011 | Nelson et al. | |
| 2011/0225565 | A1 | 9/2011 | Velzen et al. | |
| 2015/0302045 | A1 | 10/2015 | Czarny et al. | |

OTHER PUBLICATIONS

FAQs for Endpoint Encryption for PC 6.x.x., McAfee KnowledgeBase, Last Modified Dec. 2, 2013, Accessed on Jan. 29, 2014, https://kc.mcafee.com/corporate/index?page=content&id=KB66700&pmv=print.

Notice of Allowance dated Jun. 21, 2016 for U.S. Appl. No. 15/015,084.

Notice of Allowance dated Mar. 17, 2015 for U.S. Appl. No. 14/255,829.

Notice of Allowance dated Sep. 30, 2015 for U.S. Appl. No. 14/696,228.

Office Action dated Apr. 25, 2016 for U.S. Appl. No. 15/015,084.

Office Action dated Aug. 13, 2014 for U.S. Appl. No. 14/255,829.

Office Action dated Jun. 3, 2015 for U.S. Appl. No. 14/696,228.

Using Encrypting System, Microsoft.com, Nov. 3, 2005, Accessed on Jan. 29, 2014, http://technet.microsoft.com/en-us/library/bb457116(d=printer).aspx.

* cited by examiner

DETERMINING WHETHER A DATA STORAGE IS ENCRYPTED

CROSS-REFERENCE TO RELATED APPLICATIONS

This application is a continuation of U.S. application Ser. No. 15/015,084, filed Feb. 3, 2016, which was a continuation of U.S. application Ser. No. 14/696,228, now U.S. Pat. No. 9,256,635, filed Apr. 24, 2015, which was a continuation of U.S. application Ser. No. 14/255,829, now U.S. Pat. No. 9,021,163, filed Apr. 17, 2014, which are hereby incorporated by reference as if set forth in full in this application for all purposes.

BACKGROUND OF THE INVENTION

Data stored in computerized data storage devices, or volumes, is often encrypted for security purposes, privacy concerns, and data loss prevention. Additionally, in some cases, government regulations may require that certain types of data be encrypted. For example, the Health Insurance Portability and Accountability Act (HIPAA) of the United States requires that patients' records be encrypted. It is desirable in such situations, therefore, to be able to detect whether data is encrypted or not in order to be sure of compliance with such government regulations.

Current solutions for determining whether or not data is encrypted are typically product-specific. In other words, the specific product used to do the encryption must be known in order to determine the encryption state of any data. For example, some encryption products maintain a table or database with entries therein that specifically indicate whether data is encrypted or unencrypted. The method of indicating the encryption state of data must be known in order to determine from the table or database whether any particular data is encrypted or not. In some cases, custom code or product maps setting forth all known encryption products may need to be maintained in order to detect whether a particular computer device has any of these encryption products installed therein. Additionally, updates for any new encryption products introduced to the market have to be taken into account as soon as the new product is introduced in order to ensure that the custom code or product maps are always current.

The ability for an IT (information technology) administrator within a business enterprise to detect whether data is encrypted, therefore, may have to be very elaborate, complicated, and costly in order to take into consideration all of the possible encryption products and methods of encryption that may be used on all of the different computer devices within the enterprise. Additionally, maintaining this ability in the face of ever-changing numbers and types of available encryption products may be time consuming and expensive. Also, outside vendors, contractors, or temporary consultants may use their own computer devices with encryption products or techniques that are unknown to the IT administrator.

SUMMARY OF THE INVENTION

Some embodiments of the present invention generally involve a method for quickly and easily determining in many situations whether data on a computer data storage device is encrypted. The method generally comprises reading a first data through a first path from a location in a data storage (the first data having been written through the first path to the location in the data storage); reading a second data through a second path from the same location in the data storage; comparing the first data to the second data. The first data matching the second data indicates that the first path did not encrypt the first data when writing it to the data storage. The first data not matching the second data indicates that the first path encrypted the first data when writing it to the data storage. Some embodiments involve a computer-readable program stored on a non-transitory computer-readable medium, the program, when executed by a computerized system, causing the computerized system to perform the method. Some embodiments involve a computerized system with a memory storing executable instructions and a processor that performs the method by executing the instructions stored in the memory.

In some embodiments, a starting location (such as starting disk sector location) of the file in the data storage is requested (e.g. via using system and/or defrag APIs) before reading the file from the data storage. In some embodiments, successfully receiving the starting location indicates that the data storage is a physical volume; whereas, unsuccessfully receiving the starting location indicates that the data storage is a virtual volume.

DETAILED DESCRIPTION OF THE INVENTION

Reference now will be made in detail to embodiments of the disclosed invention, one or more examples of which are illustrated in the accompanying drawings. Each example is provided by way of explanation of the present technology, not as a limitation of the present technology. In fact, it will be apparent to those skilled in the art that modifications and variations can be made in the present technology without departing from the spirit and scope thereof. For instance, features illustrated or described as part of one embodiment may be used with another embodiment to yield a still further embodiment. Thus, it is intended that the present subject matter covers all such modifications and variations within the scope of the appended claims and their equivalents.

Figure 1:
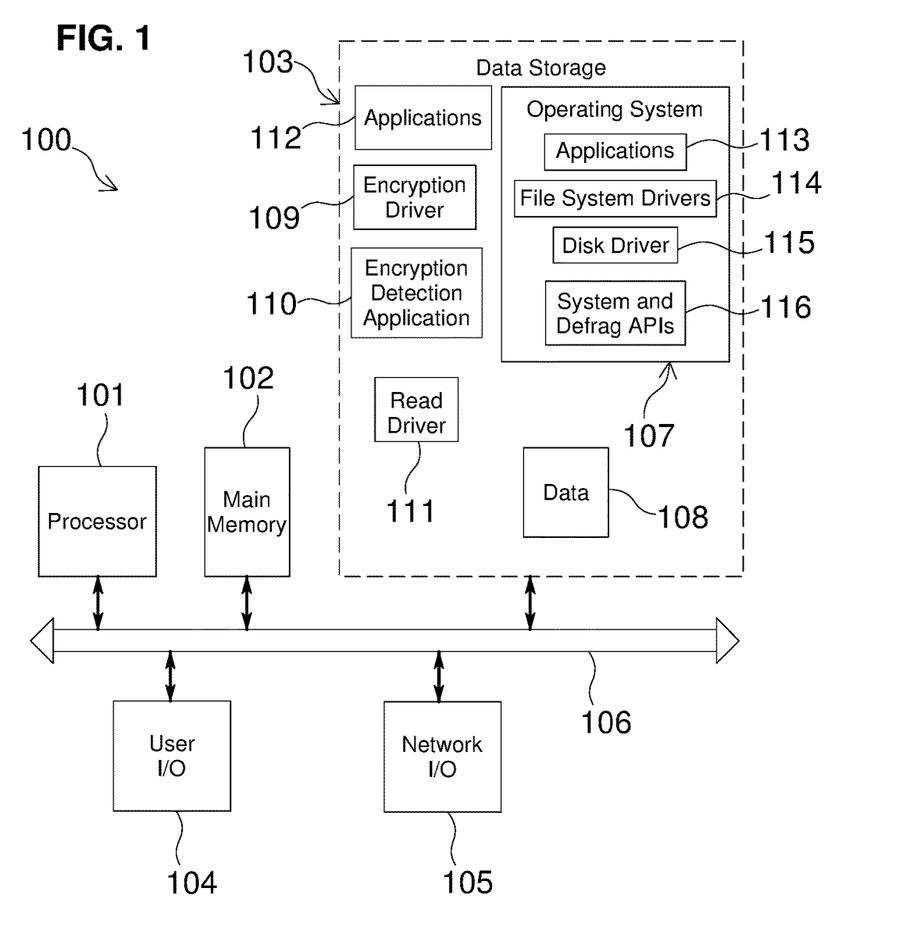
FIG. 1 is a simplified schematic diagram of an example computerized system incorporating an embodiment of the present invention.

An example computerized system 100 incorporating an embodiment of the present invention is shown in FIG. 1. The computerized system 100 generally includes a processor 101, a main memory 102, a data storage 103, a user I/O 104, and a network I/O 105, among other components not shown for simplicity, connected or coupled together by a data communication subsystem 106. At least a portion of the data storage 103 (described below) is expected to be encrypted, e.g. for compliance with HIPAA regulations and requirements or other reasons.

In some embodiments, the encryption status of the portion of the data storage 103 is determined by writing a file through one path (which may include the expected encryption capabilities) to the data storage 103, reading the file back through a different path (known not to include encryption capabilities) and comparing the written data to the read data, a mismatch thereof indicting that the write path encrypted the file contents as expected. In this manner, programs or applications (described below) can determine whether the portion of the data storage 103 is in fact encrypted. These programs or applications can make this determination without regard to the particular encryption software or method that may be used to encrypt the portion of the data storage 103, depending on the type of physical or virtual components used to form the data storage 103. In many situations, therefore, the encryption status of the portion of the data storage 103 can be determined in a quick and easy generic manner, so that a user of the computerized system 100 or another application running on the computerized system 100 or an IT administrator within an enterprise that includes the computerized system 100 can ensure compliance with any applicable encryption requirements. Conversely, the programs or applications can confirm whether data that does not need to be encrypted is in fact not encrypted.

The processor 101 generally represents one or more multipurpose or single-purpose processors, such as microprocessors, multiprocessors, graphics processors, RISC (reduced instruction set computing) processors, CISC (complex instruction set computing) processors, floating point processors, etc. The processor 101 generally performs one or more methods, including the encryption detection process described below, by executing instructions stored in the main memory 102 or data storage 103. Controls for performing these methods may originate from the main memory 102, the data storage 103, the user I/O 104 or the network I/O 105.

The main memory 102 generally represents one or more RAM (random access memory) modules, memory cards, memory boards, flash memory, static/dynamic memory, etc. Some or all of the main memory 102 may be used by the processor 101 to directly run programs and store or manipulate data. The main memory 102 generally loads executable instructions and data from the data storage 103 for use by the processor 101, e.g. to perform the encryption detection process described herein.

The data storage 103 generally represents one or more physical and/or virtual mass data storage volumes or devices for storing programs and data, even when the computerized system 100 is turned off, such as any type of non-transitory computer-readable medium, e.g. hard disks, optical disks, flash memory drives, etc. The computer-readable medium may be connected to the computerized system 100 by an internal parallel or serial bus (e.g. SCSI, SPCI, PCIe, etc.), an external connector (e.g. USB, Firewire, etc.), or a network (e.g. local area network, storage area network, wide area network, the Internet, the Web, the "Cloud", etc.). The data storage 103 generally stores an operating system 107, a variety of data 108, an encryption driver 109, an encryption detection application 110, a read driver 111, and various applications 112, among a wide variety and number of other optional and required programs and data. The operating system 107 generally includes a variety of applications 113, file system drivers 114, a disk driver 115, and system and defrag APIs 116, among other programs or modules. In some embodiments, some of the elements 107-116, or portions thereof, may be combined together or separated into different elements as appropriate.

The user I/O 104 generally represents one or more user interface input/output devices, such as displays, keyboards, pointing devices, printers, scanners, game controllers, etc. The network I/O 105 generally represents one or more wired or wireless network data communication devices for communicating with a variety of network devices or other computerized devices. The data communication subsystem 106 generally represents one or more busses, direct wiring connections, wireless connections, etc.

In other embodiments, some of the components 101-116 may be optional. Additionally, any combination of different types or numbers of the components 101-116 may be used.

The data 108 may be all or part of the contents of a physical and/or virtual volume of the data storage 103. The data 108 generally represents data that is supposed to be encrypted, e.g. by the encryption driver 109 or a component of the operating system 107. For instance, for the example involving HIPAA regulations mentioned previously, the data 108 may include patient records. A process 200 for determining whether the data 108 is encrypted is shown in a flowchart in FIG. 2. The process 200 is generally performed by, or performed under the control of, the encryption detection application 110 running on the processor 101.

Figure 2:
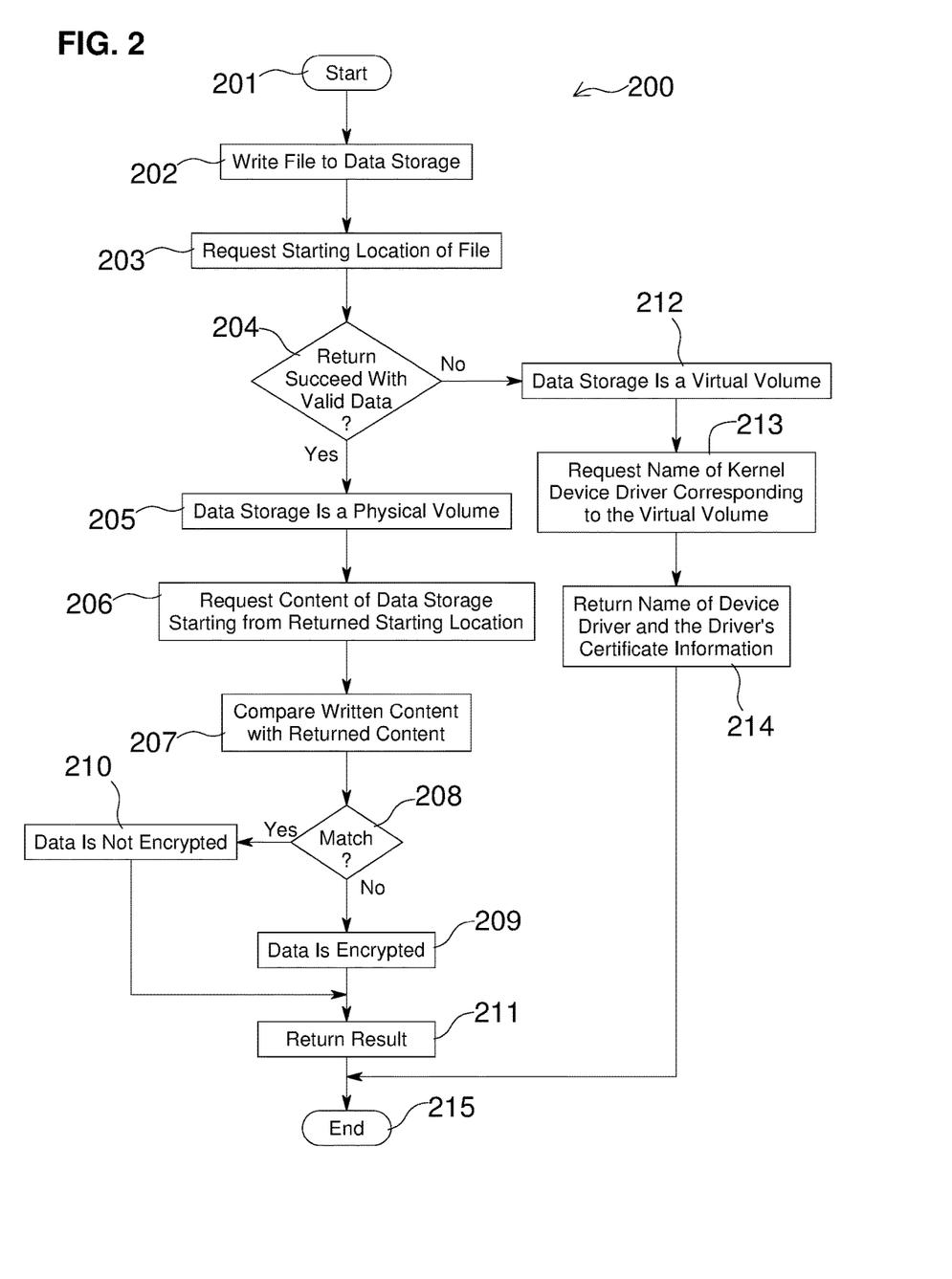
FIG. 2 is a simplified flowchart of a process for determining whether a data storage of the computerized system shown in FIG. 1 is encrypted in accordance with an embodiment of the present invention.

Upon starting (at 201), the process 200 generally writes (at 202) a file to the data 108 in the data storage 103. The contents of the file written to the data 108 may be, for example, a predefined text message or any other known string of data. The write operation uses the same procedure or path that is generally used to write to the data 108. A conventional operating system call, for example, may be used to write the file to the data 108. Additionally, the write operation may use any appropriate one or more of the applications 112 and/or 113, the file system drivers 114, and the disk driver 115 to write the file. If the data 108 is supposed to be encrypted, then any of these elements 112-115 that include encryption capability may perform the encryption, or a third party encryption code (e.g. the encryption driver 109) may perform the encryption.

At 203, the process 200 requests the starting location of the file that was written to the data 108. For example, the process 200 may request the starting disk sector location of the file using the system and defrag APIs 116 or any device driver that has sufficiently low level access to the data storage 103 as to be able to return the starting disk sector location. If the request returns (at 204) with valid data, then the data storage 103 is confirmed or verified (at 205) to be a physical volume. In other words, successfully receiving the starting location indicates that the data storage 103, or at least the portion that forms the data 108, is a physical volume or device to which the computerized system 100 has relatively low level disk driver access, such that the starting location information may be obtained. In some embodiments, such physical volume may be a storage device that is internally connected (e.g. via SCSI bus, PCI bus, etc.) to the computerized system 100, externally connected directly (e.g. via USB, Firewire, etc.) to the computerized system 100, or externally connected indirectly (e.g. via local area network, storage area network, wide area network, etc.) to the computerized system 100.

Therefore, the process 200 can request (at 206) the contents of the data storage 103 starting from the returned starting location, e.g. from a disk I/O level. This request may use the read driver 111, which is specifically designed to bypass the operating system 107 and any third party software, such as the encryption driver 109, when reading data from the data storage 103. The read driver 111, thus, performs any appropriate data read function, similar to a conventional read operation by the operating system 107, but which, unlike the write operation at 202, allows the read driver 111 to avoid, or bypass, any encryption/decryption function on the computerized system 100.

At 207, the data known to have been written in the file to the data 108 is compared to the data that has been read from the file. If the two forms of the data do not match, as determined at 208, then it is confirmed (at 209) that the procedure or path used to write the file evidently encrypted the data when it was written, since an encryption function during the write operation is presumed to be the only way that the data could have been changed so that there is no match at 208. On the other hand, if the two forms of the data match, as determined at 208, then it is confirmed (at 210) that the procedure or path used to write the file evidently did not encrypt the data when it was written.

The match/not-match or encrypted/not-encrypted result is then returned (at 211) to whoever or whatever requested that the encryption detection application 110 be performed. For example, the result may be displayed to a user on a display of the user I/O 104. Alternatively, if an IT administration routine, through the network I/O 105, caused the encryption detection application 110 to be run on the computerized system 100, then the result may be provided to the IT administration routine back through the network I/O 105, e.g. in order to alert an IT administrator of the encryption compliance, or noncompliance, of the computerized system 100.

If the request does not return (at 204) with valid data, then the data storage 103 is confirmed or verified (at 212) to be a virtual volume, such as a "Cloud"-based storage facility to which the computerized system 100 does not have sufficiently low level access to obtain the starting location information. In other words, unsuccessfully receiving the starting location requested at 203 indicates that the data storage 103, or at least the portion that forms the data 108, is a virtual volume, rather than a physical volume. In this case, the process 200 cannot request the contents of the data storage 103 starting from a returned starting location, as done at 206, since the physical location of the data 108 may be located remotely from the computerized system 100 or may be distributed across multiple physical devices and is inaccessible at the disk I/O level to the processor 101.

In this case, the process 200 requests (at 213) the name of the kernel device driver corresponding to the virtual volume for the data 108. At 214, the name of the device driver and the driver's certificate information are returned to the process 200, which provides this information to whoever or whatever requested that the encryption detection application 110 be performed. With this information, the encryption status of the data 108, or of the data storage 103 as a whole, can be looked up or determined, e.g. as in a conventional manner.

After 211 or 214, the process 200 may end at 215, having provided either the encryption status of the data 108 or the device driver and the driver's certificate information with which the encryption status can be subsequently obtained.

In some embodiments, instead of writing a special file to the data 108 through one path and reading the contents of the file back through another path, the encryption detection application 110 may read any existing file (or portion thereof) from the data 108 in a conventional way (e.g. at the application level through any of the applications 112 or through the operating system 107) and then read the same file with the read driver 111. If the file is encrypted, then the first read operation will decrypt the file, whereas the second read operation will not. The two results may be compared to determine whether or not the file was encrypted. Again, a match indicates that the file was not encrypted, whereas a mismatch indicates that the file was encrypted.

Figure 3:
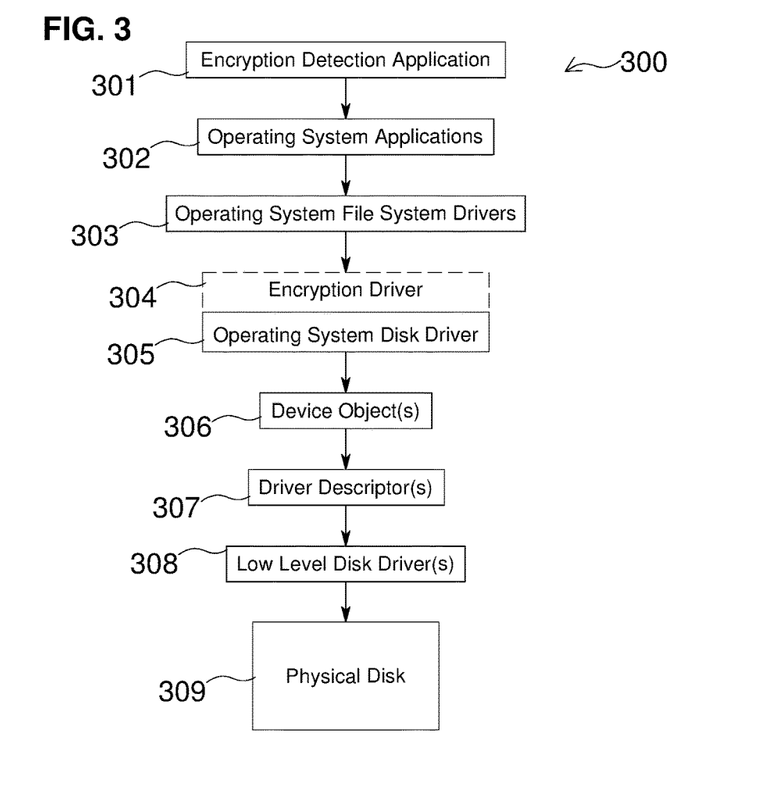
FIG. 3 is a simplified flowchart for a write process used within the process shown in FIG. 2 in accordance with an embodiment of the present invention.

In some embodiments, the write operation of 202 (when the data 108 is a physical volume) is further illustrated by a logic flow 300 shown in FIG. 3 showing the interaction between logical and physical elements of the computerized system 100. The logic flow 300 begins in the user mode space, or application level, at 301 with the encryption detection application 110. The encryption detection application 110 transfers the write request to one of the applications 113 at 302 in the operating system 107, e.g. the file manager application in the Windows™ operating system.

The application 113 transfers the write request (e.g. through the Windows™ file system I/O flow) to the operating system file system drivers 114 at 303 in the kernel mode space, or operating system level. Then the write request is transferred (e.g. through a Windows™ disk I/O flow) to the (third party) encryption driver 109 at 304, if present, and then to the operating system disk driver 115 (e.g. a Windows™ generic disk driver, Disk.sys) at 305. The write request is then transferred to one or more device objects at 306 and one or more driver descriptors at 307 from which the addresses for the low level disk drivers at 308 can be obtained, so that the write request can be further transferred through physical links to the physical disk or volume at 309 for the data 108 in the hardware space.

Figure 4:
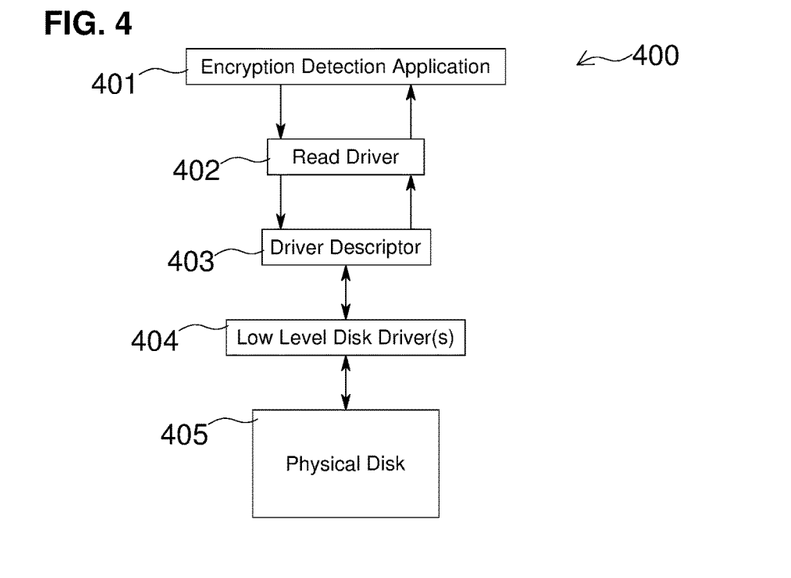
FIG. 4 is a simplified flowchart for a read process used within the process shown in FIG. 2 in accordance with an embodiment of the present invention.

In some embodiments, the read operation of 206 (when the data 108 is a physical volume) is further illustrated by a logic flow 400 shown in FIG. 4 showing the interaction between logical and physical elements of the computerized system 100. The logic flow 400 begins in the user mode space, or application level, at 401 with the encryption detection application 110. The encryption detection application 110 transfers the read request to the read driver 111 in the kernel mode space or operating system level at 402, e.g. using a device I/O control function that provides a device input and output control (IOCTL) interface through which an application can communicate directly with a device driver and bypass the operating system 107. The read driver 111 at 402 determines which low level disk driver is to be used by obtaining the address of the low level disk driver from the driver descriptor at 403. A direct read request is made to the low level object by sending an I/O read request for the specific disk sector contents to the low level disk driver at 404. The low level disk driver at 404 requests the desired disk sector contents from the physical disk at 405 through a physical link to the hardware space. The physical disk at 405 transfers the requested disk sector contents back through the low level disk driver at 404 to the read driver at 402. The read driver 111 at 402 returns the disk sector contents, without affecting the encryption status of the returned contents, to the encryption detection application 110 at 401.

Figure 5:
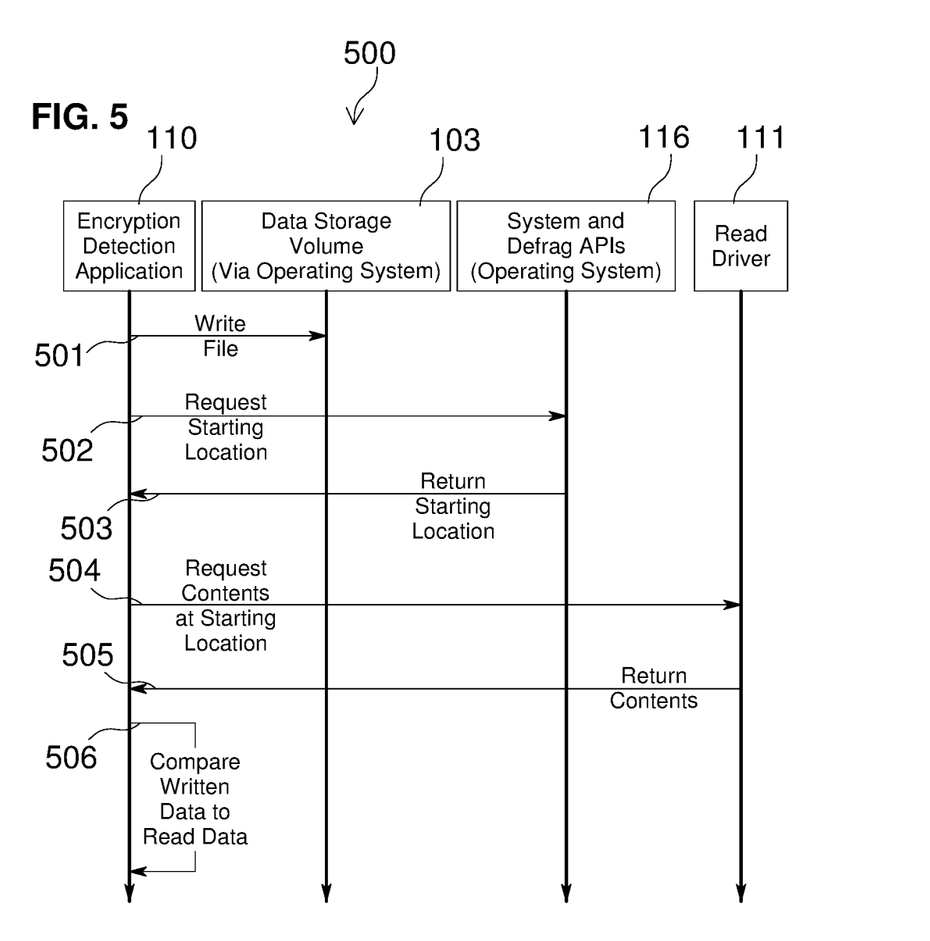
FIG. 5 is a simplified flowchart for a portion of the process shown in FIG. 2 when a data storage is a physical volume in accordance with an embodiment of the present invention.

In some embodiments, the process 200 (when the data 108 is a physical volume) is further illustrated by a logic flow 500 shown in FIG. 5 showing the interaction between logical and physical elements of the computerized system 100. The logic flow 500 begins with the encryption detection application 110 writing (at 501) a file (e.g. a text message) to the data 108 of the data storage volume 103 through the operating system 107 (and the encryption driver 109, if any), e.g.

in accordance with the logic flow 300. The encryption detection application 110 then requests (at 502) the starting location (of the file that was just written) from the system and defrag APIs 116. The system and defrag APIs 116 return (at 503) the starting location (e.g. the starting disk sector location) to the encryption detection application 110. The encryption detection application 110 then sends (at 504) to the read driver 111 a request for the contents at the starting location, e.g. at the disk sector starting location. After the read driver 111 obtains the contents of the file at the starting location, e.g. in accordance with the logic flow 400, the read driver 111 returns (at 505) the contents to the encryption detection application 110. The encryption detection application 110 then compares (at 506) the known written data to the read data (i.e. the returned sector contents). If there is a match between the two, then the data 108 is not encrypted. Otherwise, the data 108 is encrypted.

Figure 6:
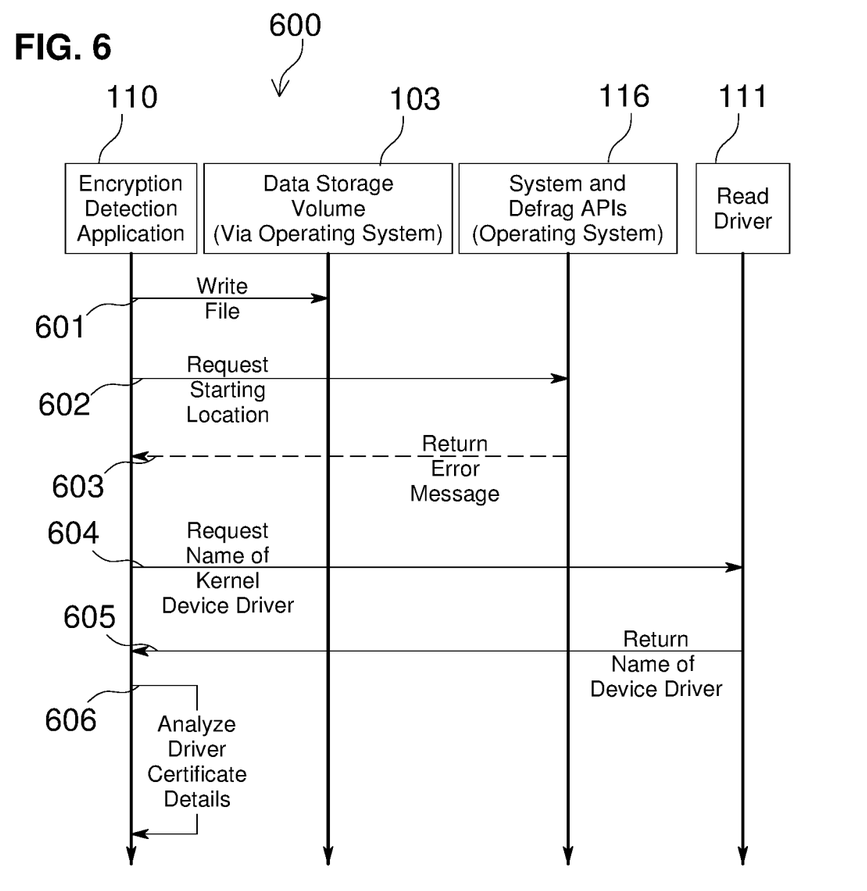
FIG. 6 is a simplified flowchart for a portion of the process shown in FIG. 2 when a data storage is a virtual volume in accordance with an embodiment of the present invention.

In some embodiments, the process 200 (when the data 108 is a virtual volume) is further illustrated by a logic flow 600 shown in FIG. 6 showing the interaction between logical and physical elements of the computerized system 100. The logic flow 600 begins with the encryption detection application 110 writing (at 601) a file (e.g. a text message) to the data 108 of the data storage volume 103 through the operating system 107 (and the encryption driver 109, if any), e.g. in accordance with the logic flow 300. The encryption detection application 110 then requests (at 602) the starting location (of the file that was just written) from the system and defrag APIs 116. The system and defrag APIs 116 return (at 603) an error message to the encryption detection application 110 indicating that the starting location could not be obtained, since the data 108 is a virtual volume in this example. The encryption detection application 110 then requests (at 604) from the read driver 111 the name of the kernel device driver that owns the device object corresponding to the desired volume. The read driver 111 then returns (at 605) the name of the device driver (and the driver's certificate information). The encryption detection application 110 then analyzes (at 606) the driver certificate details to determine a way in which the encryption status of the data 108 can be determined.

Advantages of the present invention include the ability of an enterprise security/IT administrator (and vendors of products to these customers) to more reliably monitor and enforce requirements regarding computing devices having an encrypted storage volume before gaining access to networks or other protected resources, such as a database containing patient health information. The present invention, thus, helps prevent non-compliant computing devices from accessing sensitive data.

Although embodiments of the invention have been discussed primarily with respect to specific embodiments thereof, other variations are possible. Various configurations of the described structure or process may be used in place of, or in addition to, the configurations presented herein.

Those skilled in the art will appreciate that the foregoing description is by way of example only, and is not intended to limit the invention. Nothing in the disclosure should indicate that the invention is limited to systems that are implemented on a single computerized system. In general, any diagrams presented are only intended to indicate one possible configuration, and many variations are possible. Those skilled in the art will also appreciate that methods and systems consistent with the present invention are suitable for use in a wide range of applications encompassing encryption and security systems.

While the specification has been described in detail with respect to specific embodiments of the invention, it will be appreciated that those skilled in the art, upon attaining an understanding of the foregoing, may readily conceive of alterations to, variations of, and equivalents to these embodiments. These and other modifications and variations to the present invention may be practiced by those skilled in the art, without departing from the spirit and scope of the present invention, which is more particularly set forth in the appended claims.

What is claimed is:

1. A computerized system, comprising:
   a memory storing executable instructions;
   a data storage; and
   a processor, coupled to the memory and the data storage, that performs a method by executing the instructions stored in the memory, the method comprising:
   reading a first data through a first path from a location in the data storage, wherein the first data was written through the first path to the location in the data storage;
   reading a second data through a second path from the location in the data storage;
   comparing the first data to the second data to determine whether the first data matches the second data;
   upon determining that the first data matches the second data, determining that the first path did not encrypt the first data; and
   upon determining that the first data does not match the second data, determining that the first path encrypted the first data.

2. The computerized system of claim 1, wherein:
   the first data and the second data are a same portion of a same file stored in the data storage.

3. The computerized system of claim 1, wherein the method further comprises:
   before reading the second data through the second path, requesting a starting location of the first data in the data storage using a device driver with access to the data storage; and
   reading the second data through the second path from the data storage using the starting location.

4. The computerized system of claim 3, wherein:
   the requesting of the starting location uses system and defrag APIs to request a starting disk sector location of the first data.

5. The computerized system of claim 1, wherein the method further comprises:
   before reading the second data through the second path, requesting a starting location of the first data in the data storage using a device driver with access to the data storage, the requesting of the starting location not resulting in successfully receiving the starting location; and
   requesting a name of a device driver for the data storage.

6. The computerized system of claim 1, wherein:
   the second path involves a device driver that bypasses an operating system file system driver.

7. A method comprising:
   reading, by a computerized system, a first data through a first path from a location in a data storage, wherein the first data was written through the first path to the location in the data storage;
   reading, by the computerized system, a second data through a second path from the location in the data storage; and comparing, by the computerized system, the first data to the second data to determine whether the first data matches the second data;

wherein a match between the first data and the second data indicates that the first path did not encrypt the first data, and a mismatch between the first data and the second data indicates that the first path encrypted the first data.

8. The method of claim 7, wherein:

the first data and the second data are a same portion of a same file stored in the data storage.

9. The method of claim 7, further comprising:

requesting, by the computerized system using a device driver that has access to the data storage, a starting location of the first data in the data storage; and reading, by the computerized system, the second data through the second path at the starting location in the data storage.

10. The method of claim 9, wherein:

successfully receiving the starting location indicates that the data storage is a physical volume.

11. The method of claim 7, further comprising:

requesting, by the computerized system, a starting location of the first data in the data storage, the requesting of the starting location not resulting in the computerized system successfully receiving the starting location; and requesting, by the computerized system, a name of a device driver for the data storage.

12. The method of claim 11, wherein:

the requesting of the starting location not resulting in the computerized system successfully receiving the starting location indicates that the data storage is a virtual volume.

13. The method of claim 7, wherein:

the first path involves an operating system call to the data storage.

14. The method of claim 7, wherein:

the second path involves a device driver that bypasses an operating system file system driver.

15. A computer-readable program stored on a non-transitory computer-readable medium, the program, when executed by a computerized system, causing the computerized system to perform a method comprising:

reading a first data through a first path from a location in a data storage, wherein the first data was written through the first path to the location in the data storage;

reading a second data through a second path from the location in the data storage;

comparing the first data to the second data to determine whether the first data matches the second data;

upon determining that the first data matches the second data, determining that the first path did not encrypt the first data; and upon determining that the first data does not match the second data, determining that the first path encrypted the first data.

16. The computer-readable program of claim 15, wherein:

the first data and the second data are a same portion of a same file stored in the data storage.

17. The computer-readable program of claim 15, wherein the method further comprises:

requesting, using a device driver that has access to the data storage, a starting location of the first data in the data storage; and reading the second data through the second path at the starting location in the data storage.

18. The computer-readable program of claim 17, wherein:

successfully receiving the starting location by the computerized system indicates that the data storage is a physical volume.

19. The computer-readable program of claim 15, wherein the method further comprises:

requesting a starting location of the first data in the data storage;

upon the requesting of the starting location resulting in the computerized system successfully receiving the starting location, proceeding with the reading of the second data through the second path at the starting location in the data storage; and upon the requesting of the starting location not resulting in the computerized system successfully receiving the starting location, requesting a name of a device driver for the data storage.

20. The computer-readable program of claim 15, wherein:

the second path involves a device driver that bypasses an operating system file system driver.

* * * * *